United States Patent [19]

Ledoux et al.

[11] Patent Number: 4,914,070

[45] Date of Patent: Apr. 3, 1990

[54] PROCESS FOR THE PRODUCTION OF SILICON CARBIDE WITH A LARGE SPECIFIC SURFACE AREA AND USE FOR HIGH-TEMPERATURE CATALYTIC REACTIONS

[75] Inventors: Marc J. Ledoux; Jean-Louis Guille; Sylvain Hantzer, all of Strasbourg; Dominique Dubots, Le Fayet, all of France

[73] Assignee: Pechiney Electrometallurgie, Courbevoie, France

[21] Appl. No.: 254,149

[22] Filed: Oct. 6, 1988

[30] Foreign Application Priority Data

Oct. 19, 1987 [FR] France ............................ 87 14742
Jan. 29, 1988 [FR] France ............................ 88 01399
Mar. 30, 1988 [FR] France ............................ 88 04727

[51] Int. Cl.$^4$ ........................ B01J 21/18; B01J 27/22
[52] U.S. Cl. ................................. 502/178; 423/346; 423/440
[58] Field of Search ................. 502/178; 423/346, 440

[56] References Cited

U.S. PATENT DOCUMENTS

| | | | |
|---|---|---|---|
| 1,266,478 | 5/1918 | Hutchins | 423/346 |
| 1,930,716 | 10/1933 | Jaeger | 502/178 |
| 2,431,326 | 11/1947 | Heyroth | 423/346 |
| 2,451,485 | 10/1948 | Hearne et al. | 502/178 |
| 3,526,602 | 9/1970 | Kobayashi et al. | 502/178 |
| 3,839,542 | 10/1974 | Chase | 423/440 |
| 4,784,839 | 11/1988 | Bachelard et al. | 423/440 |

*Primary Examiner*—Carl F. Dees
*Attorney, Agent, or Firm*—Dennison, Meserole, Pollack & Scheiner

[57] ABSTRACT

The invention is directed to a process for the production of fine grains of silicon carbide which are formed by an agglomerate of submicronic grains having a specific surface area that is at least 100 $m^2 \cdot g^{-1}$, which are intended in particular to serve as a carrier for catalysts for petrochemistry, and for catalytic reactions at elevated temperature which can attain 1000° C., the process comprising reacting vapors of silicon monoxide SiO on carbon, being characterized by: generating vapors of SiO in a first reaction zone by heating a mixture $SiO_2 + Si$ at a temperature of between 1100° and 1400° C., under a pressure of between 0.1 and 1.5 hPa; and, in a second reaction zone, contacting the SiO vapors with reactive carbon in the divided state with a specific surface area that is at least equal to 200 $m^2 \cdot g^{-1}$ at a temperature of between 1100° and 1400° C. Preferably, the reactive carbon is doped by an addition of from 1 to 10% by weight of a metallic element selected from uranium, cerium, titanium, zirconium, hafnium and lanthanides.

10 Claims, 1 Drawing Sheet

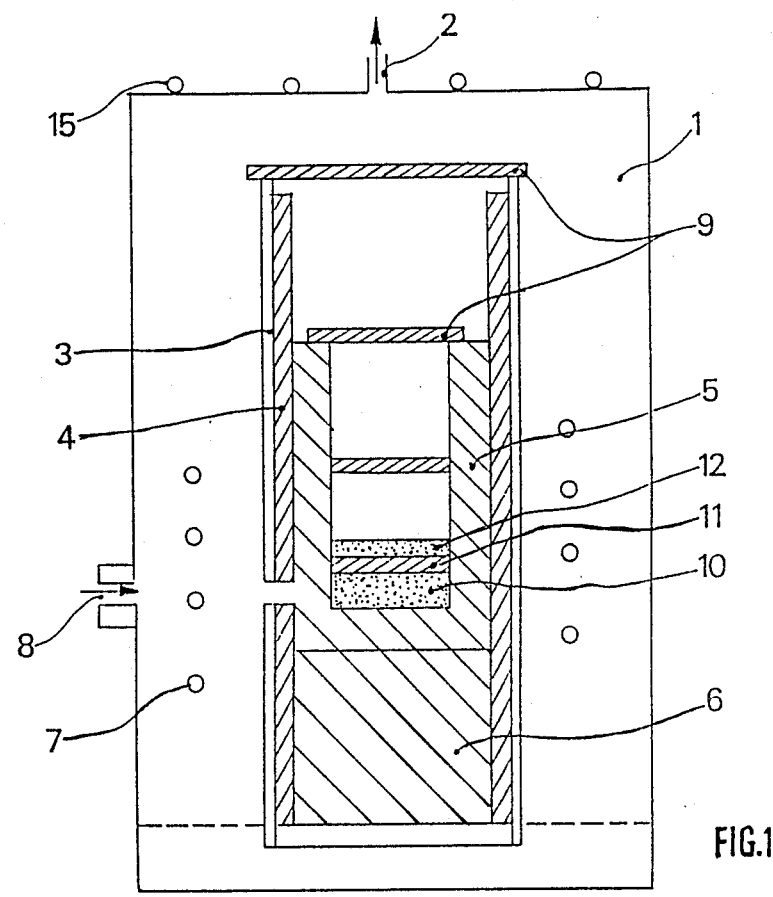
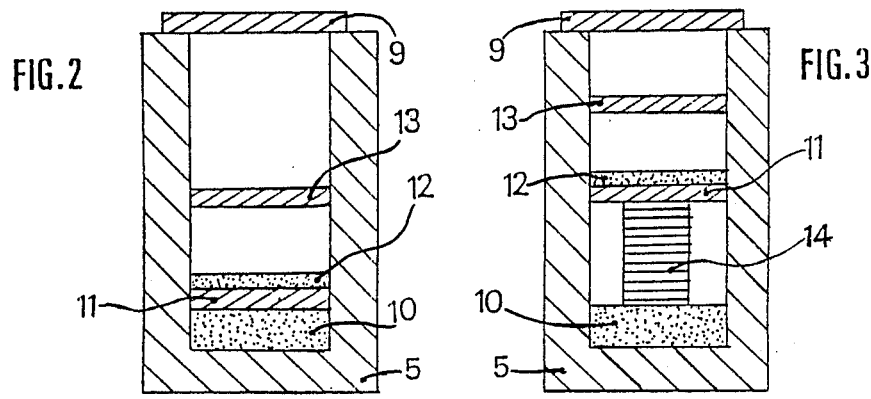
FIG.1  FIG.2  FIG.3

PROCESS FOR THE PRODUCTION OF SILICON CARBIDE WITH A LARGE SPECIFIC SURFACE AREA AND USE FOR HIGH-TEMPERATURE CATALYTIC REACTIONS

TECHNICAL FIELD OF THE INVENTION

The present invention concerns a process for the production of silicon carbide with a large specific surface area, intended in particular to serve as a catalyst carrier in petrochemistry and in high-temperature catalytic reactions.

STATE OF THE ART

The heavy phases of oils have the enormous disadvantage of containing compounds with high carbon contents and low hydrogen contents, which are responsible for coking of the catalysts, while nitrogen and sulphur derivatives may be the cause of serious levels of pollution and neutralise the cracking porperties of the catalysts, while finally metals affect the level of efficiency of the catalysts by being fixed thereon. To remedy those disadvantages the various cuts from the distillation operation are subjected to a purification step: that is the purpose of hydro-treatments.

In such reactions the hydrocarbon compounds catalytically react in the presence of hydrogen:
- hydro-cracking results in smaller molecules,
- hygrogenation results in an increase in the H/C ratio and saturation of the aromatic and olefinic compounds, and
- hydro-desulphurisation (HDS), hydro-denitrogenation (HDN), hydro-deoxygenation (HDO) and hydro-demetallation (HDM) are responsible for the elimination of heteroatoms and metals contained in such hydrocarbons by breaking the C—S, C—N, C—O or C—Me bond.

The catalysts which are used at the present time are catalysts based on molybdenum sulphide and tungsten sulphide. They are composed of an active phase which is responsible for the activity thereof and which is carried on suitable materials ensuring stability thereof.

The precursor of the active phase is formed by mixed oxides associating elements in group VIB (Mo, W) and elements in group VIII (Fe, Co, and Ni). Those oxides are sulphurised prior to use in order to give them the required activity and stability.

The catalysts are deposited on a carrier. The function of the carrier is to maintain the active phase in a condition of high dispersion, by virtue of a large specific surface area. It is necessary for it to be good quality in order mechanically to withstand the severe conditions in terms of temperature and pressure and the successive regeneration operations. The main catalyst carriers used in industry are aluminas whose texture can be modified in the course of preparation thereof or alumino-silicates which are amorphous or sometimes crystalline (zeolites), which are sometimes doped with other oxides.

The catalyst progressively becomes deactivated with the passage of time under the action of coke and metals. Thus the treatment of heavy phases gives rise to enormous poisoning problems. The accumulation of coke is linked to decomposition of aromatic compounds of high molecular weight. It gives rise to a drop in activity which is compensated for in a first phase by a suitable increase in temperature. Periodically however the coke has to be burnt and the catalyst is recycled. The number of such cycles is not unlimited as the active phase of the catalyst gradually penetrates into the carrier and is therefore no longer accessible to the products involved.

When the reaction occurs, the metals, primarily vanadium and nickel, in the form of organo-metallic complexes and porphyrins, are deposited on the catalyst, progressively blocking the pores thereof. No regeneration method is economically possible and the catalyst has to be replaced. Recycling of the metals of the active phase as well as the vanadium is also not economically viable; the presence of the aluminate ion after advanced oxidation of the poisoned catalyst requires it to be subjected to an alkaline fusion operation which cannot be applied to the tonnages generally used (several tens of tonnes).

Silicon carbide could constitute an ideal catalyst carrier. In face, it withstands the double poisoning effect due to the coke and the metals:

due to the coke:

Upon regeneration of the catalyst, hot points are formed (combustion of grains of coke, which is highly exothermic). At those locations the active phase of the catalyst passes into the carrier in the form of aluminates. The use of SiC would resolve that disadvantage and would thus increase the operating life of the catalyst.

due to metals:

After poisoning by the metals, the SiC, by virtue of its chemical inertia, could be treated and could thus provide an attractive source of vanadium (it is not possible at the present time to extract vanadium from an alumina carrier), and it could permit recovery of molybdenum and cobalt for example.

Outside the field of petrochemistry, there are many high-temperature catalytic reactions in which the present catalyst carriers could be replaced by silicon carbide, for the same reasons. Unfortunately at this time it is not possible to produce silicon carbide with a large specific surface area comparable to that of alumina, that is to say in the range of several tens to several hundreds of square metres per gram and even greater if possible.

In the publication Preceed. Brit. Ceram. Soc. May 1983, pages 1244 ff, P. KENNEDY and B. NORTH described an experimental process for the production of silicon carbide of fine grain size (means size of the particles from 3 to 4.5 micrometers) by passing vapours of silicon monoxide (SiO) over a divided carbonaceous substrate at a temperature of the order of 1400° to 1500° C. Unfortunately the silicon carbide produced has a very low specific surface area of the order of around ten square meters per gram, which excludes any use thereof as a catalyst carrier. Likewise the process described in patent application GA-A-2 017 667, and corresponding U.S. Pat. No. 4,342,837, which also involves reacting SiO on C at between 1340° and 1440° C. under a pressure of the order of $10^{-5}$ mm Hg results in a powder of SiC of type having a specific surface area of 15 $m^2 \cdot g^1$. As regards the conventional process referred to as the Acheson process (reaction of $SiO_2$ on C at elevated temperature of much higher than 2000° C.), it is known that it produces a crystallised silicon carbide of solid structure which is certainly not suitable for use as a catalyst carrier.

SUBJECT OF THE INVENTION

A first subject of the present invention is a process for the production of fine grains of silicon carbide which are formed by an agglomerate of submicronic grains having a specific surface area of at least 100 $m^2 \cdot g^1$, which are intended in particular to serve as a carrier for catalysts for petrochemistry and for high-temperature catalystic reactions (at up to 1000° C.), said process which involves reacting vapours of silicon monoxide SiO on carbon being characterised by:

generating vapours of SiO in a first reaction zone by heating a mixture $SiO_2+Si$ at a temperature of between 1100° and 1400° C. under a pressure of between 0.1 and 1.5 hPa, and in a second reaction zone contacting the vapours of SiO with reactive carbon in the divided state with a specific surface area of at least 200 $m^2 \cdot g^{-1}$ at a temperature of between 1100° and 1400° C.

Preferably the SiO production temperature is between 1200° and 1300° C. and the temperature of the reaction of SiO on C is between 1100° and 1200° C.

A second subject of the invention is the use of silicon carbide with a large specific surface area as a carrier for catalysts for many chemical reactions at elevated temperature of higher than 500° C. and which can be between 650° and 1000° C., being performed in the presence of a catalyst. Among such uses, mention may be made of the following:

(1) The silencers or mufflers of internal combustion engines, which are intended to convert carbon monoxide and any unburnt hydrocarbons into carbon dioxide and water and also to convert nitrogen oxides into $NO_2$, and for which use is made at the present time of activated alumina with rhodium and/or platinum salts. Silicon carbide of high specific surface area ($>100$ $m^2/g$) can be activated by impregnation with a salt of rhodium (such as a chloride) and/or platinum (hexachloroplatinic acid salt) at a concentration which is equal to or even lower (with the same level of efficiency) than that which is used in the case of alumina.

Besides a reduction in cost price, it is found that silencers or mufflers using silicon carbide according to the invention as a catalyst carrier have a substantially increased useful service life. In particular such silencers or mufflers are not sensitive to abrupt increases in the temperature of the exhaust gases.

(2) Catalysts referred to as catalysts for "controlled oxidation" of hydrocarbons of low molecular mass such as methane, which are often based on lithium or manganese oxide and which make it possible to provide for conversion into hydrocarbons with a long carbon chain and of relatively high molecular mass, at a temperature of the order of 650° to 800° C. In that use the catalysts which are carried by alumina rapidly lose in effectiveness as a result of a rapid drop in the specific surface area of the alumina. In that particular use silicon carbide is remarkably resistant; tests have shown that the specific surface area of a sample, which is initially 120 $m^2/g$, was still 60 $m^2/g$ after prolonged heating at 1000° C. In the case of a uranium-doped silicon carbide the initial surface area of 200 $m^2/g$ is still from 120 to 130 $m^2/g$ after prolonged heating at 1000° C.

(3) In petrochemistry, hydrotreatment (hydro-desulphurisation, hydro-demetallation . . . ) reactions using a mixed catalyst such as cobalt-molybdenum which is usually supported by alumina, silica or activated carbon: replacement thereof by silicon carbide with a large specific surface area affords many advantages, as indicated above.

FIGS. 1 to 3 show the apparatus used for carrying the invention into effect.

FIG. 1 shows the whole of the apparatus.

FIGS. 2 and 3 show two possible configurations of the reaction pot.

A—DESCRIPTION OF THE REACTOR

The reactor in which the preparation of SiC with a large specific surface area is effected comprises a sealed container 1 in which a vacuum can be produced by means of a pump (not shown) connected to the delivery tube 2.

A tube of silica 3 which is internally coated with carbon felt 4 acting as an insulating agent and separator is placed in the container 1.

Disposed within the tube 3 is a graphite pot 5 supported by a block of graphite 6. The pot 5 is heated by induction by means of the winding 7. A sight window 8 permits temperature measurement by means of optical pyrometry. The pot 5 is covered with a sheet of carbon felt 9, as well as the upper part of the silica tube 3, so as to prevent the excess SiO condensing on the inside surface of the furnace. The cover comprises a cooling circuit 15 which involves the circulation of water.

The mixture $SiO_2+Si$ (10) is placed in the bottom of the graphite pot 5; the carbon on which the reaction $SiO+2C \rightarrow SiC+CO$ is going to taken place is placed above it.

It can be disposed in two configurations:

In FIG. 2, the mixture 10 ($SiO_2+Si$) is covered by a sheet 11 of carbon felt intended to separate the SiO generation zone from the SiC formation zone and then a layer 12 of reactive carbon powder. Above the layer 12 and at a certain spacing (for example towards the mid-height level of the pot), it is possible to add an additional sheet 13 of carbon felt, still for the same purpose of retaining any excess of SiO.

In FIG. 3 the precursor mixture 10 ($SiO_2+Si$) is separated from the SiO+C reaction zone by a spacer means which may be formed for example by a sheet of graphite felt, of a width h, which is wound in a spiral. The width h which determines the spacing between the SiO generation zone and the SiO+C reaction zone can be modified as a parameter of the reaction. That separating means is surmounted by a sheet 11 of carbon felt and a layer 12 of reactive carbon powder. By varying the width h, the SiO generation mechanism is increased without increasing the SiC formation temperature.

B—DESCRIPTION OF THE PROCESS

The precursor mixture 10 ($SiO_2+Si$) is heated under a reduced pressure of the order of 0.1 to 1.5 mm hPa to a temperature which is at most equal to 1400° C. and preferably between 1100° C. and 1400° C.

The SiO vapours generated pass through the separating means of carbon felt as indicated at 11 and then the layer 12 of reactive carbon powder in which occurs the reaction $SiO+2C \rightarrow SiC+CO$.

The choice of "reactive carbon" substantially influences the way in which the reaction takes place.

The following were used:

graphite pellets (obtained by powder agglomeration);

activated carbon in powder form (obtained by crushing sieved granules to produce a granulometry of 0.250 to 0.425 mm and with a specific surface area of the order of 1150 $m^2/g$ (Activated Charcoal provided by FLUKA);

activated carbon doped with a metal selected from uranium, cerium, titanium, zirconium, hafnium and lanthanides by impregnation in solution for example from acetyl-acetonates compounds and then carburised in argon for 4 hours at 450° C. The degree of doping is of the order of 4 to 4.5% by weight of the metal chosen. The specific surface area of the carbon is then slightly reduced but the degree of transformation is substantially enhanced.

The parameters were:
the amount of precursor mixture $SiO_2+Si$,
temperature, and
duration.

Quantity of precursor: A ratio of 4 parts by weight of precursor for 2.5 parts by weight of carbon was used. Operation is thus with an excess of SiO, that ensuring reproducibility of the operating conditions. The mixture $SiO_2+Si$ is preferably equimolecular but there is no disadvantage in operating with mixtures which deviate somewhat from stoichiometry.

Temperature: The structure is of increasing fineness in proportion to a falling temperature in respect of the reaction of SiO on the carbon.

At 1400° C. the result obtained is particles with a mean size of the order of 0.2 micrometers in the configuration shown in FIG. 2, and even finer in the configuration shown in FIG. 3, with a height h of separation between the two compartments (generation of SiO and reaction of SiO on C) of 40 mm.

At a temperature of 1250° C., in both configurations, the result is finer particles (<0.1 um), as well as some trichites. It has been found that it was possible to operate at a temperature as low as 1100° C.

If the temperature rise phase includes a degassing plateau, it is found that the specific surface area of the SiC obtained is increased.

The degassing operation may be effected at ambient temperature (for example for 45 minutes) (30 minutes to 1 hour) but it is particularly effective if it is carried out at about 875° C. (between 850° and 900° C.) for a period which can go from 1 to 4 hours.

Duration

The period of time for which the reaction temperature (1100° C./1400° C.) is maintained is preferably between 4 and 7 hours because of the slow speed of the reaction mechanism in that temperature range.

Final treatment

Preferably the silicon carbide obtained is subjected to a post-roasting operation in the air, of a duration which can be between ½ and 2 hours, at a temperature of the order of 600° to 800° C., the aim thereof being to destroy the carbon residues that may still be contained in the reaction mass, the effect thereof being to increase the specific surface area by about 5 to 10%.

C—CHARACTERISATION OF THE SiC OBTAINED

In the various cases involved, there is collected the carbonaceous substrate covered with SiC of type crystallised in a face-centered cubic lattice. The colour of the SiC may range from dark blue to mouse grey or to sea green of a more or less dark shade.

In order to remove the carbonaceous substrate which could falsify measurements in respect of specific surface area, a roasting operation in air is effected at a temperature of 600° to 800° C. for 1 to 2 hours (for example). The silicon carbide finally produced is in the form of agglomerates of submicronic grains.

In order to characterise it, the following observations and measurements are made:

firing loss (upon roasting of the carbonaceus substrate), which makes it possible to ascertain the transformation yield;

radiocrystallographic characterisation by X-ray diffraction in a Debye-Scherrer chamber;

observation under an optical microscope and using an electronic scan microscope;

measurement of the B.E.T. specific surface area, using the normal method involving absorption of a gas; and chemical examination.

In regard to certain samples, washing operations using hydrofluoric acid were effected to detect the possible formation of $SiO_2$, and operations for quantitative determination of residual carbon were also performed.

RESULTS

By optimising the reaction conditions, the result was specific surface areas which attain up to 400 $m^2/g$, which are to be compared to the surface area of the SiC which was produced in the publication referred to as prior art (15 $m^2/g$) and the surface area of 200 $m^2/g$ of aluminas which are usually employed as a carrier for catalysts in the petrochemistry field.

Table I sets out of the conditions under which the tests resulting in the highest specific surface areas were effected.

TABLE I

| Test No | 1 | 2 | 3 | 4 |
| --- | --- | --- | --- | --- |
| Reaction temperature in ° C. | 1225 | 1250 | 1250 | 1250 |
| Degassing time/T° C. | 4h 30 875 | 45 min 20 | 2 h 875 | 1 h 875 |
| Nature of the carbon | Activated | Activated | Activated | Activated |
| Doping | Carbon | Carbon | Carbon 4% U | Carbon |
| Appearance of the SiC produced | Dark blue | Dark grey | Light grey | Dark grey |
| Loss due to roasting % | 28 | 21 | 40 | 18 |
| Mean dimensions of the grains μm | 0.2 | 0.1 | 0.1 | 0.1 |
| Specific surface area $m^2/g$ | 196 | 141 | 363 | 121 |

USE IN PETROCHEMISTRY OF SILICON CARBIDE WITH A LARGE SPECIFIC SURFACE AREA

In order to verify the quality of the catalysts on a substrate of SiC with a large specific surface area in accordance with the invention, a batch of mixed cobalt-molybdenum catalysts was produced, intended for hydro-treatment reactions (HDS) in the sulphur phase (hydro-desulphurisation), the carrier being SiC of a granulometry of 0.250/0.425 mm and with a specific surface area of 170 $m^2/g$, which is impregnated using known methods applied to conventional catalysts on activated carbon or silica or alumina.

The starting salt for impregnation of the Mo is ammonium heptamolybdate of the following formula:

$$Mo_7(NH_4)_6O_{24}$$

The amount of salt which is the active element is dissolved in the solvent (water), the volume of which is of the order of the pore volume of the mass of carrier used.

The catalyst is prepared by pouring the solution over the carrier. The catalyst which is impregnated in that way is left at rest for two hours at ambient temperature and then baked at 120° C. overnight and sulphurised directly in situ and finally roasted in the air in a furnace at 500° C. for two hours (in the case of silica or alumina type treatment only).

The same operation is begun again to impregnate the cobalt, the starting salt then being cobalt nitrate of the following formula:

$Co(NO_3)_2, 6H_2O$

To calculate the amount of cobalt nitrate salt, it is necessary to take account of an atomic ratio of 0.3 between Mo and Co, which was verified by analysis by neutron activation. That ratio corresponds to the maximum level of synergy which exists between Co and Mo.

A series of comparative tests was carried out, using as the carrier for the same catalyst, activated carbon, silica, alumina, SiC of low specific surface area (20 m²/g) and SiC according to the invention (170 m²/g).

The criterion in respect of effectiveness adopted was the rate of hydro-desulphurisation (HDS) of thiophene transformed per gram of catalyst and per second or per gram of catalyst per second and per square meter.

The results appear in Table II.

TABLE II

| Nature of the catalyst carrier | Rate of hydro-desulphurisation reaction of thiophene | |
|---|---|---|
| | mol/g.s | mol/g.s.m² |
| Activated carbon 1150 m².g⁻¹ | 20,000 | 17 |
| Silica 550 m².g⁻¹ | 2,480 | 4.5 |
| Alumina 220 m².g⁻¹ | 15,000 | 75 |
| SiC 20 m².g⁻¹ | 200 | 7 |
| SiC 170 m².g⁻¹ | 2,630 | 15 |
| SiC (5.8% U) 363 m².g⁻¹ | 8,300 | 23 |

Those results can be considered as highly satisfactory, especially if account is taken of the fact that the catalyst on an SiC carrier can easily be regenerated and recovered at the end of its life.

USES OF SILICON CARBIDE WITH A LARGE SPECIFIC SURFACE AREA FOR HIGH-TEMPERATURE CATALYTIC REACTIONS: INFLUENCE OF DOPING OF ACTIVATED CARBON

A—Doping with uranium

Activated carbon with a large specific surface area was doped with uranium by impregnation by means of an alcohol solution of uranyl acetylacetate, so as to give a level of concentration by weight of uranium (in the initial activated carbon) of 8 to 15%. The carbon when treated in that way was roasted in argon at 500° C. and then introduced into the reactor and reacted with silicon monoxide in accordance with the invention. The specific surface area of the silicon carbide obtained in that way was then measured prior to roasting and after roasting in the air for 2 hours at 1000° C. The results are as follows:

| % U by weight | 0 | 8.5 | 9.8 | 15 |
|---|---|---|---|---|
| m²/g prior to roasting | 197 | 425 | 410 | 279 |
| m²/g after 2 hours at 1000° C. | 59 | 109 | 131 | 76 |

It appears that the optimum level of concentration of uranium in the activated carbon occurs at about 8 to 10% by weight, corresponding to a real content in the silicon carbide of the order of 13 to 14% by weight.

X-ray examination shows that the uranium occurs in the silicon carbide in the form of $U_3O_7$ prior to roasting and in the form of $U_3O_8$ after roasting for 2 hours at 1000° C.

B—Doping with cerium

The same procedure was adopted in connection with doping of the activated carbon with cerium by impregnation thereof with water-soluble cerium salts such as the nitrate $Ce(NO_3)_2$, 6 $H_2O$ or ammoniacal nitrate $(NH_4)_2Ce(NO_3)_6$.

The results are as follows:

| % Ce in the activated carbon (by weight) | 3 | 5 nitrate | 5 nitrate | 5 ammoniacal nitrate |
|---|---|---|---|---|
| m²/g prior to roasting | 303 | 376 | 292 | 320 |
| m²/g after 2 hours at 1000° C. | 73 | 94 | 134 | 141 |

It is found that the nature of the cerium salt has a certain influence on the final result, with the same concentration of cerium, probably due to differences in penetration of the solution into the pores of the activated carbon. The two tests with ammoniacal nitrate correspond to slight modifications in the parameters of the reaction of SiO on C producing the SiC. It is also found that doping with cerium is at least as effective as doping with uranium. Other doping agents may be used and in particular salts of titanium, zirconium, hafnium and lanthanides.

EXAMPLE OF USE

The invention was carried into effect under conditions which simulate operation of catalytic silencers or mufflers for internal combustion engines under conditions in accordance with the European standards being prepared.

Four devices simulating a catalytic silencer or muffler were prepared, the catalyst being a platinum-rhodium mixture, the concentration of active phase being 0.2% Pt and 0.02% by weight Rh.

The 4 catalysts were respectively deposited by conventional processes on the following:
active alumina with an area of 235 m²/g
non-roasted SiC with an area of 125 m²/g
SiC roasted at 800° C., with an area of 30 m²/g, and
SiC roasted at 1000° C., with an area of 18 m²/g.

A gas simulating an engine exhaust gas was passed over the catalyst at a flow rate per minute of 58.5 cm³ of $CO+N_2$, 350 ppm of $C_3H_8$ and 450 ppm of NO.

The effectiveness of those 4 catalysts was measured from the point of view of conversion of CO into $CO_2$ and nitrogen sub-oxides into $NO_2$ and oxidation of the unburnt materials, in dependence on temperature.

The results are set out in the following Table. It is found that SiC roasted at 800° C. exhibits a level of effectiveness which is entirely comparable to that of the alumina. It should be added that SiC also has a point of very great superiority over the alumina, which is the capacity for recovery of the catalyst, which in contrast gives rise to major problems in the case of the alumina.

| Temperature T at x % of conversion (°C.) | GAS CO | NO$_x$ | C$_3$H$_8$ |
|---|---|---|---|
| T-10% Ref. Al$_2$O$_3$ | 211° C. | 231° C. | 251° C. |
| SiC prior to roasting | 252 | 249 | 304 |
| SiC after roasting | 231 | 215 | 275 |
| SiC after roasting 1000° C. (roasted in air, 15 h) | 304 | 305 | 348 |
| T-25% Ref. Al$_2$O$_3$ | 230 | 244 | 264 |
| SiC prior to roasting | 271 | 269 | 307 |
| SiC after roasting 800° C. | 244 | 232 | 280 |
| SiC after roasting 1000° C. (roasted in air, 15 h) | 322 | 322 | 362 |
| T-50% Ref. Al$_2$O$_3$ | 245 | 252 | 350 |
| SiC prior to roasting | 284 | 282 | 347 |
| SiC after roasting 800° C. | 259 | 251 | 385 |
| SiC after roasting 1000° C. (roasted in air, 15 h) | 338 | 336 | 380 |
| T-75% Ref. Al$_2$O$_3$ | 257 | 265 | 394 |
| SiC prior to roasting | 296 | 292 | 412 |
| SiC after roasting 800° C. | 266 | 265 | 462 |
| SiC after roasting 1000° C. (roasted in air, 15 h) | 352 | 349 | 404 |
| T-90% Ref. Al$_2$O$_3$ | 270 | 279 | 419 |
| SiC prior to roasting | 304 | 301 | 450 |
| SiC after roasting 800° C. | 270 | 272 | 488 |
| SiC after roasting 1000° C. (roasted in air, 15 h) | 364 | 360 | 429 |

CONVERSION RATE %

| Effectiveness in % | Spec.Surf. | CO | NO$_x$ | C$_3$H$_8$ |
|---|---|---|---|---|
| Reference (Al$_2$O$_3$) | 235 m$^2$/g | 71.0 | 71.0 | 58.7 |
| SiC prior to roasting | 125 | 62.1 | 63.9 | 54.4 |
| SiC after roasting 800° C. | 30 | 69.7 | 73.1 | 52.0 |

It is noted that the effectiveness of the catalyst deposited on SiC roasted at 800° C. and with a surface area of 30 m$^2$/g is substantially the same as that of the catalyst on alumina as regards CO and NO$_x$, and is scarcely less as regards unburnt matter.

Those results can be further improved by optimising the doping effect (using uranium, cerium or other material) in dependence on the aim to be achieved as, by carrying the invention into effect, it is easy to use as a carrier for the active phase of the catalyst, SiC which at a temperature of 800° C. retains a specific surface area of greater than 300 m$^2$/g and, at a temperature of 1000° C., an area which is still higher than 100 m$^2$/g.

We claim:

1. A process for the production of fine grains of silicon carbide which are formed by an agglomerate of submicronic grains having a specific surface area that is at least 100 m$^2 \cdot$g$^{-1}$, which are intended in particular to serve as a carrier for catalysts for petrochemistry, and for catalytic reactions at elevated temperature which can attain 1000° C., the process comprising reacting vapours of silicon monoxide SiO on carbon by the steps of:
   (a) generating vapours of SiO in a first reaction zone by heating a mixture of SiO$_2$+Si at a temperature of between 1100° and 1400° C., under a pressure of between 0.1 and 1.5 hPa; and
   (b) contacting in a second reaction zone at a temperature of between 1100° and 1400° C., the SiO vapours generated in said first reaction zone with finely divided reactive carbon with a specific surface area that is equal to or greater than 200 m$^2 \cdot$g$^{-1}$.

2. A process according to claim 1 characterised in that the SiO generation temperature is preferably between 1200° and 1300° C.

3. A process according to claim 1 characterised in that the temperature of the reaction of SiO on C is preferably between 1100° and 1200° C.

4. A process according to claim 1 characterised in that the reactive carbon is doped by an addition of from 1 to 10% by weight of a metallic element selected from uranium, cerium, titanium, zirconium, hafnium and lanthanides.

5. A process according to claim 1 characterised in that, in the step involving the rise to the SiO+C reaction within the temperature range of 1100° to 1400° C., a degassing step is effected.

6. A process according to claim 5 characterised in that the degassing step is effected at ambient temperature for a period of from 30 minutes to 1 hours.

7. A process according to claim 5 characterised in that the degassing step is effected at a temperature of between 850° and 900° C. for a period of from 1 hour to 4 hour.

8. A process according to any one of claims 1-3 or 4-7 characterised in that the silicon carbide obtained is subjected to a post-roasting operation in air at a temperature of the order of 600° to 800° C. for a period of the order of from ½ to 2 hours.

9. A process according to any one of claims 1-3, 4 or 5 characterised in that it is performed in an atmosphere of inert gas selected from the group consisting of argon and helium.

10. Silicon carbide catalyst carrier produced by the process of claim 1.

* * * * *